(12) United States Patent
Wakisaka et al.

(10) Patent No.: US 11,976,962 B2
(45) Date of Patent: May 7, 2024

(54) OPTICAL-FIBER PATH SEARCHING METHOD, OPTICAL-FIBER PATH SEARCHING SYSTEM, SIGNAL PROCESSING DEVICE, AND PROGRAM

(71) Applicant: NIPPON TELEGRAPH AND TELEPHONE CORPORATION, Tokyo (JP)

(72) Inventors: Yoshifumi Wakisaka, Musashino (JP); Daisuke Iida, Musashino (JP); Kunihiro Toge, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 730 days.

(21) Appl. No.: 15/734,211

(22) PCT Filed: May 29, 2019

(86) PCT No.: PCT/JP2019/021356
§ 371 (c)(1),
(2) Date: Dec. 1, 2020

(87) PCT Pub. No.: WO2019/235330
PCT Pub. Date: Dec. 12, 2019

(65) Prior Publication Data
US 2021/0223095 A1    Jul. 22, 2021

(30) Foreign Application Priority Data
Jun. 5, 2018   (JP) .................................. 2018-107971

(51) Int. Cl.
*G01B 17/04*  (2006.01)
*G01D 5/353*  (2006.01)
*G01H 9/00*   (2006.01)

(52) U.S. Cl.
CPC ............. *G01H 9/004* (2013.01); *G01B 17/04* (2013.01); *G01D 5/35358* (2013.01)

(58) Field of Classification Search
CPC ...................................................... G01B 17/04
(Continued)

(56) References Cited

U.S. PATENT DOCUMENTS 6,229,762 B1 *  5/2001  Fisher .................. H04R 23/008
                                                       367/149
6,269,198 B1 *  7/2001  Hodgson ................. G01V 1/52
                                                       356/478

(Continued)

OTHER PUBLICATIONS

Ali. Masoudi, T.P. Newson, "Contributed Review: Distributed Optical Fibre Dynamic Strain Sensing", Review of Scientific Instruments, vol. 87, p. 011501 (2016).

*Primary Examiner* — Kaveh C Kianni
(74) *Attorney, Agent, or Firm* — Harness, Dickey & Pierce, P.L.C.

(57) ABSTRACT

An object is to provide an optical fiber path search method, an optical fiber path search system, a signal processor, and a program that can be operated free of the effects of walls, supporting members, and the like so that only a signal generated by an acoustic wave propagating through the air can be extracted. An optical fiber path search system according to the present invention utilizes DAS and includes: a vibration source 304 configured to provide an acoustic wave to a predetermined region; a light reflection measurement device 305 configured to be connected to one end of an optical fiber 302 and configured to measure vibration of a change in an optical path length from the other end of the optical fiber 302 to a point in the optical fiber 302 due to the acoustic wave provided by the vibration source 304; and a signal processor 313 configured to extract a signal component in a high frequency region higher than a preset cutoff (Continued)

frequency from a signal of the vibration of the change in the optical path length measured by the light reflection measurement device 305 and calculate a distance between the vibration source 304 and the point in the optical fiber 302 using the signal component.

3 Claims, 2 Drawing Sheets

(58) Field of Classification Search
USPC .......................................................... 385/17
See application file for complete search history.

(56) References Cited

U.S. PATENT DOCUMENTS

| | | | | |
|---|---|---|---|---|
| 6,288,975 B1* | 9/2001 | Frederick | ............... | G01V 1/186 181/102 |
| 6,332,029 B1* | 12/2001 | Azima | ................... | H04R 1/021 381/337 |
| 6,724,319 B1* | 4/2004 | Knaack | ................. | G01H 9/004 359/290 |
| 6,728,165 B1* | 4/2004 | Roscigno | ............... | G01H 9/004 181/102 |
| 11,341,410 B1* | 5/2022 | Johnson | ................... | G06N 5/01 |
| 2005/0146726 A1* | 7/2005 | Balachandran | ..... | G01D 5/35303 356/480 |
| 2005/0157305 A1* | 7/2005 | Yu | ....................... | G01D 5/35303 356/480 |
| 2011/0033062 A1* | 2/2011 | Deng | ..................... | H04R 3/005 381/92 |
| 2012/0046866 A1* | 2/2012 | Meyer | ..................... | E21B 28/00 702/6 |
| 2013/0151203 A1* | 6/2013 | Mcewen-King | ........ | G06F 17/00 702/189 |
| 2014/0152995 A1* | 6/2014 | Dong | ................ | G01D 5/35316 356/477 |
| 2015/0182160 A1* | 7/2015 | Kim | ..................... | A61B 5/7475 600/301 |
| 2016/0259079 A1* | 9/2016 | Wilson | ...................... | E21B 7/06 |
| 2017/0039826 A1* | 2/2017 | Cojocaur | ............. | G08B 13/124 |
| 2017/0075029 A1* | 3/2017 | Cuny | ....................... | G01V 1/52 |
| 2017/0191363 A1* | 7/2017 | Dickenson | ............. | G01F 1/661 |
| 2017/0235006 A1* | 8/2017 | Ellmauthaler | ........... | G01V 1/42 702/6 |
| 2018/0058197 A1* | 3/2018 | Barfoot | ................... | E21B 47/00 |
| 2019/0293458 A1* | 9/2019 | Digonnet | .............. | G01H 9/006 |
| 2020/0249075 A1* | 8/2020 | Ma | ......................... | G02B 26/04 |
| 2021/0199494 A1* | 7/2021 | Miles | .................... | G01D 5/2412 |

\* cited by examiner

OPTICAL-FIBER PATH SEARCHING METHOD, OPTICAL-FIBER PATH SEARCHING SYSTEM, SIGNAL PROCESSING DEVICE, AND PROGRAM

CROSS-REFERENCE TO RELATED APPLICATIONS

This application is a 371 U.S. National Phase of International Application No. PCT/JP2019/021356, filed on May 29, 2019, which claims priority to Japanese Application No. 2018-107971 filed on Jun. 5, 2018. The entire disclosures of the above applications are incorporated herein by reference.

TECHNICAL FIELD

The present disclosure relates to a facility search technique for identifying a position and a path of a routed optical fiber cable.

BACKGROUND ART

Propagation of acoustic waves to an optical fiber is known to cause increase/decrease in length as well as increase/decrease in refractive index at various points in the longitudinal direction of the optical fiber due to the vibration caused by the acoustic waves, resulting in a change in an optical path length.

The change in optical path length at various points in the optical fiber in the longitudinal direction over time can be detected by injecting probe light into the optical fiber from a light reflection measurement device and receiving light as a result of the probe light scattering and reflecting at various points in the optical fiber in the longitudinal direction. In principle, the change in optical path length at various points in the longitudinal direction of the optical fiber results in phase modulation of the scattered and reflected probe light, and this phase modulation is detected by a detector. Such sensing of acoustic waves through an optical fiber has been researched and developed as Distributed Acoustic Sensing (hereinafter, referred to as DAS) (see, e.g., Non Patent Literature 1). Specific principles for the measurement include Optical Time Domain Reflectometry (OTDR) and Optical Frequency Domain Reflectometry (OFDR).

The Global Positioning System (GPS) emits radio wave signals from a satellite and receives the emitted signals at a receiver. The time is synchronized between the satellite and the receiver, and the radio wave signal includes time information emitted from the satellite, such that traveling time required for the signal emitted from the satellite to reach the receiver can be determined. The signal emitted from the satellite can be regarded as spherical waves. Thus, the distance between the satellite and the receiver can be determined by multiplying the traveling time by the speed of the radio wave signal. For a plurality of satellites at different locations, measuring the distance between the receiver and each of the plurality of satellites determines the position of the receiver from position information about the individual satellites.

Taking advantage of the feature of the DAS that the waveform of the acoustic waves reaching the various points in the longitudinal direction of the optical fiber can be sensed using the light reflection measurement device, the positions of the various points in the longitudinal direction of the optical fiber can be determined through applying the principle of GPS. In this fashion, it is possible to search an optical fiber path.

Instead of emitting radio wave signals from the satellite, the acoustic waves are spherically emitted from a vibration source. Then, treating the various points in the optical fiber in the longitudinal direction as the receivers, the acoustic waves are propagated to a point in the optical fiber in the longitudinal direction, to induce a change in the optical path length. Using DAS, the change in the optical path length thus induced is monitored, and the time point at which the acoustic wave has reached the point in the optical fiber in the longitudinal direction can be measured. The time is synchronized between the vibration source and the DAS, and the traveling time required for the acoustic waves to reach the point in the optical fiber in the longitudinal direction from the vibration source can be determined. Thus, the distance between the vibration source and the individual point in the optical fiber in the longitudinal direction can be determined by multiplying the traveling time by the speed. Alternatively, because the magnitude of the change in the optical path length caused by the acoustic wave is inversely proportional to the distance between the vibration source and a point in the optical fiber in the longitudinal direction, the distance between the vibration source and the point in the optical fiber in the longitudinal direction can be determined by measuring the magnitude of the change in the optical path length caused. For a plurality of vibration source at different locations, measuring the distance between each of the plurality of vibration sources and each point in the optical fiber in the longitudinal direction can determine the position of each point in the optical fiber in the longitudinal direction based on the position of the individual vibration sources. Thus, the path of the optical fiber can be recognized.

CITATION LIST

Non Patent Literature

Non Patent Literature 1: Ali. Masoudi, T. P. Newson, "Contributed Review: Distributed Optical Fibre Dynamic Strain Sensing", Review of Scientific Instruments, Vol. 87, p. 011501 (2016)

SUMMARY OF THE INVENTION

Technical Problem

The optical fiber path search method applying the above-described principle of the GPS can be used to determine the path of an optical fiber included in an optical fiber cable used in communication facilities/buildings, to enable the search for the optical fiber cable. Unfortunately, the following problem arises when the optical fiber path search method is employed, to which a principle similar to that of the GPS is applied.

Typically, an optical fiber cable is provided beneath a wall or the like with an air layer provided in between, and has some portions in the longitudinal direction fixed to the wall by a supporting member or the like. When the acoustic waves are emitted from the vibration source on the wall in order to search for the optical fiber cable beneath the wall, not only the acoustic waves traveling as a spherical wave through the air layer directly reach a point in the optical fiber in the longitudinal direction but also acoustic waves propagating through a solid such as the supporting member and a fiber outer sheath reach the point in the optical fiber in the longitudinal direction. As a result, in the acoustic wave that is sensed by the DAS at the point in the optical fiber in the longitudinal direction, the waves propagating through a solid such as the supporting member and a fiber outer sheath are superimposed on the spherical wave propagated in the air layer. Thus, the intensity as well as the traveling time of the vibration caused by the acoustic waves propagating through the air required for the optical fiber path search cannot be measured, thereby making the identification of the optical fiber difficult.

Thus, in order to solve the problem described above, an object of the present invention is to provide an optical fiber path search method, an optical fiber path search system, a signal processor, and a program that can eliminate the influence of walls, supporting members, and the like and only a signal generated by the acoustic waves propagating through the air can be extracted.

Means for Solving the Problem

In order to achieve the object described above, the optical fiber path search method according to the present invention includes: generating an acoustic wave with a desired carrier frequency and a desired waveform; emitting the acoustic wave into an optical fiber search area; and executing high pass filtering processing to extract only a signal generated by the acoustic wave propagating in a space to reach the optical fiber directly, from a signal of a return light received by a light reflection measurement unit.

Specifically, an optical fiber path search method according to the present invention is an optical fiber path search method that utilizes distributed acoustic sensing (DAS) and includes: providing an acoustic wave from a vibration source to a predetermined region;
  measuring, by a light reflection measurement device connected to one end of an optical fiber, vibration of a change in an optical path length from another end of the optical fiber to a point in the optical fiber due to the acoustic wave provided in the providing the acoustic wave; extracting a signal component in a high frequency region that is higher than a preset cutoff frequency from a signal of the vibration of the change in the optical path length measured in the vibration measurement; and
  calculating a distance between the vibration source and the point in the optical fiber using the signal component extracted in the extracting.

An optical fiber path search system according to the present invention is an optical fiber path search system that utilizes distributed acoustic sensing (DAS), the optical fiber path search system including:
  a vibration source configured to provide an acoustic wave to a predetermined region; a light reflection measurement device configured to be connected to one end of an optical fiber and configured to measure vibration of a change in an optical path length from another end of the optical fiber to a point in the optical fiber due to the acoustic wave provided by the vibration source; and
  a signal processor configured to extract a signal component in a high frequency region that is higher than a preset cutoff frequency from a signal of the vibration of the change in the optical path length measured by the light reflection measurement device and calculate a distance between the vibration source and the point in the optical fiber using the signal component.

A signal processor according to the present invention is a signal processor for an optical fiber path search system that utilizes distributed acoustic sensing (DAS), the signal processor including an operating unit configured to:
  provide an acoustic wave from a vibration source to a predetermined region;
  receive a signal of vibration of a change in an optical path length due to the acoustic wave measured by a light reflection measurement device connected to one end of an optical fiber, the optical path length from another end of the optical fiber to a point in the optical fiber;
  extract a signal component in a high frequency region that is higher than a preset cutoff frequency from a signal of the vibration of the change in the optical path length; and
  calculate a distance between the vibration source and the point in the optical fiber using the signal component.

The present invention utilizes a difference in cycles between a change in the optical path length of the optical fiber due to the acoustic wave propagating in the air (high frequency) and a change in the optical path length of the optical fiber due to the acoustic wave propagating in solid (low frequency), to remove the latter using a high pass filter. Furthermore, employing three or more different locations for the vibration source and acquiring coordinates of a point in the optical fiber enable identification of the position of the optical fiber. Thus, the present invention can provide an optical fiber path search method, an optical fiber path search system, and a signal processor that can be operated free of the effects of walls, supporting members, and the like so that only a signal generated by the acoustic waves propagating through the air can be extracted.

Depending on an arrangement of the optical fiber (distance between the vibration source and a measurement point in the optical fiber), the difference in cycles between the change in the optical path length of the optical fiber due to the acoustic wave propagating in the air and the change in the optical path length of the optical fiber due to the acoustic wave propagating in a solid can be small, resulting in a risk of the high pass filter removing the signal generated by the acoustic wave propagated in the air. For such a case, the following measure is provided.

In a case where the signal component in the high frequency region fails to be extracted in the extracting, the vibration source is placed at a different position, a process from the providing an acoustic wave to the extracting a signal component is repeated, and when the signal component in the high frequency region is successfully extracted, the distance is determined in the calculating. For the signal generated by the acoustic wave propagated through the air, a cycle of the change in the optical path length of the optical fiber varies depending on the distance between the generation source of the acoustic wave and the optical fiber. Specifically, a longer distance from the generation source of the acoustic wave to the optical fiber leads to a shorter cycle (higher frequency) of the change in the optical path length of the optical fiber, whereby the signal generated by the acoustic wave at a portion far from the generation source of the acoustic wave may not be removed by the high pass filter.

In a case where the signal generated by the acoustic wave propagating in the air cannot be acquired with the measure described above, the optical fiber is determined to be absent in the search region. Specifically, when the signal component in the high frequency region fails to be extracted in the extracting, it is determined that the optical fiber is absent in the predetermined region.

The present invention provides a program causing a computer to function as the signal processor. The signal processor according to the present invention can also be realized by a computer and a program, and can also record a program in a recording medium and provide a program through a network.

Effects of the Invention

The present invention can provide an optical fiber path search method, an optical fiber path search system, a signal processor, and a program that can be operated free of the effects of walls, supporting members, and the like so that only a signal generated by the acoustic waves propagating through the air can be extracted.

DESCRIPTION OF EMBODIMENTS

Hereinafter, embodiments of the present invention will be described with reference to the drawings. The embodiment described below is an example of the present disclosure, and the present disclosure is not limited to the following embodiment. In this specification and the drawings, constituent elements having the same reference signs are assumed to be the same.

First Embodiment

Figure 1:
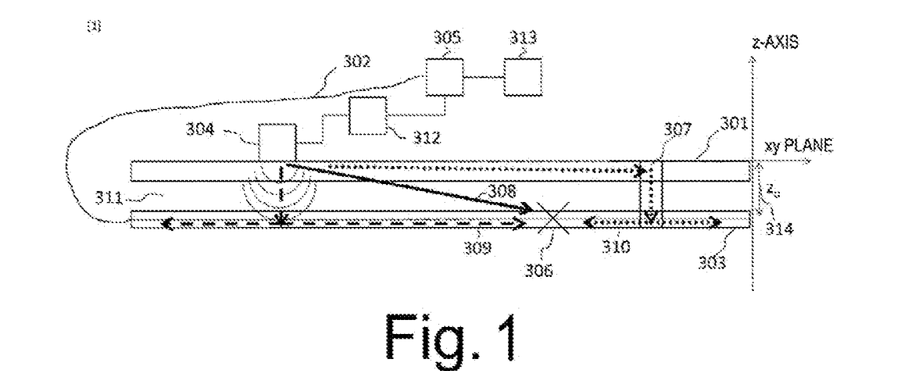
FIG. 1 is a diagram illustrating a method for searching for paths of optical fibers in a wall using an optical fiber path search system according to the present invention.
Figure 2:
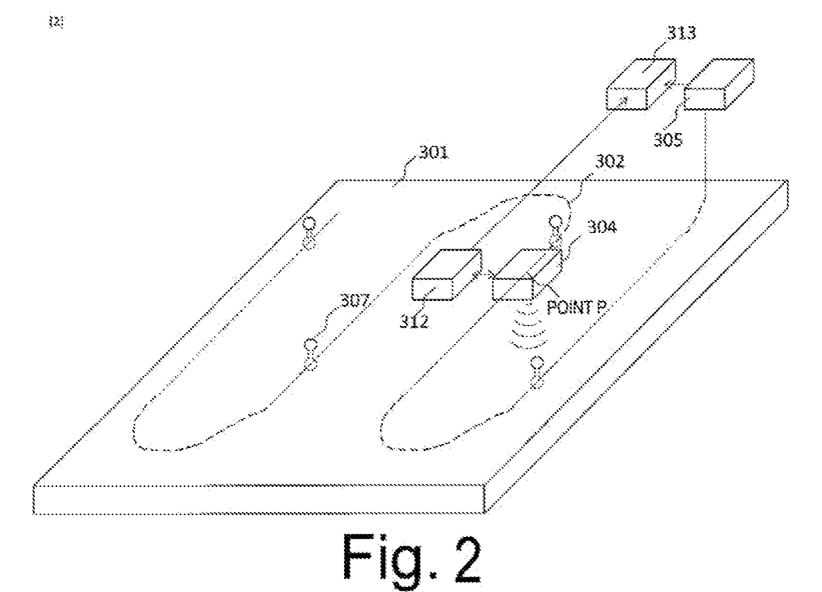
FIG. 2 is a diagram illustrating a method for searching for paths of optical fibers in a wall using the optical fiber path search system according to the present invention.

FIGS. 1 and 2 are diagrams illustrating a method for searching for paths of optical fibers in a wall using an optical fiber path search system according to the present embodiment. This optical fiber path search system is an optical fiber path search system that utilizes distributed acoustic sensing (DAS) and includes:
  a vibration source 304 configured to provide an acoustic wave to a predetermined region; a light reflection measurement device 305 configured to be connected to one end of an optical fiber 302 and configured to measure vibration of a change in an optical path length from the other end of the optical fiber 302 to a point in the optical fiber 302 due to the acoustic wave provided by the vibration source 304; and
  a signal processor 313 configured to extract a signal component in a high frequency region that is higher than a preset cutoff frequency from a signal of the vibration of the change in the optical path length measured by the light reflection measurement device 305 and calculate a distance between the vibration source 304 and the point in the optical fiber 302 using the signal component.

As illustrated in FIG. 1, an optical fiber cable 303 incorporating an optical fiber core 302 is provided beneath a wall 301 with an air layer 311 interposed therebetween, and a fastener 307 that supports the optical fiber cable 303 is provided. FIG. 2 is a three-dimensional view of FIG. 1, illustrating a plurality of fasteners 307. An object is to search for the position of the optical fiber cable 303 beneath the wall 301 in an environment in which one end of the optical fiber core in the optical fiber cable is accessible.

The following specific example describes a method for searching for a path of the cable 303, in a case where the distance of the optical fiber cable 303 in the vertical direction from the wall 301 is constant, and when the z-axis direction serves as an axis perpendicular to the wall as illustrated by a constant distance 314 in FIG. 1, the wall and the optical fiber cable are separated in the z-axis direction by a constant distance $z_0$.

Furthermore, in the method described below, an example for searching for a cable is described, in a following case. The acoustic wave is emitted from the vibration source 304 to search for an optical fiber cable. The case is where, compared to the intensity of the acoustic wave propagating spherically through the air layer and reaching each point of the optical fiber in the longitudinal direction of the optical fiber, effects of an acoustic wave emitted from the vibration source 304 and propagating through the optical fiber 302 itself, the outer sheath of the optical fiber cable 303, or the like via the fasteners 307, which support the optical fiber cable 303, or the like are too large to be negligible; the example described provides a method with fewer errors in measurement results by eliminating the effects described above.

This method includes:
  providing an acoustic wave from a vibration source 304 to a predetermined region;
  measuring, by a light reflection measurement device 305 connected to one end of an optical fiber 302, vibration of a change in an optical path length from another end of the optical fiber 302 to a point in the optical fiber 302 due to the acoustic wave provided in the providing the acoustic wave; extracting a signal component in a high frequency region that is higher than a preset cutoff frequency from a signal of the vibration of the change in the optical path length measured in the measuring the vibration; and
  calculating a distance between the vibration source 304 and the point in the optical fiber 302 using the signal component extracted in the extracting.

Providing Acoustic Wave

First of all, the light reflection measurement device 305 provided with DAS is connected to one end in advance, at a known position, of the optical fiber core 302 in the optical fiber cable 303.

Next, the acoustic wave is emitted from the vibration source 304 and propagated to the optical fiber core 302 inside the optical fiber cable 303. The waveform of the acoustic wave is controlled by a signal generator 312. In the following examples, the vibration source 304 emits an acoustic wave (carrier) at a desired frequency, and the signal generator 312 controls the emission timing of the vibration source 304, so that an acoustic wave with a pulse-shape envelope is generated. However, the shape of the envelope is not limited thereto.

Measuring Vibration

The signal generator 312 and the light reflection measurement device 305 are synchronized, and a change in the optical path length at a point in the longitudinal direction of the optical fiber is measured over time at the timing at which the signal generator 312 emits the acoustic wave. The change in optical path length over time at the point in the longitudinal direction of the optical fiber measured by the light reflection measurement device 305 is transmitted to the signal processor 313. The phase OTDR and OFDR is available for the principle for the light reflection measurement device 305 to implement the DAS, as long as a specification required for implementing a specific method as described later is satisfied.

The change in optical path length over time at the point in the longitudinal direction of the optical fiber measured by the light reflection measurement device 305 and transmitted to the signal processor 313 includes, in addition to the vibration caused by an acoustic wave propagating spherically in the air layer, which is to be used for cable searching, vibration caused by an acoustic wave propagating through the fiber solid body and the fiber outer sheath solid body through the fastener 307 or the like that is not used for the cable searching.

For example, as illustrated in FIG. 1, the change in optical path length at a point 306 in the longitudinal direction of the optical fiber includes, in addition to the acoustic wave propagating through the path 308 that travels linearly from the vibration source 304 to the point 306 via the air layer 311, an acoustic wave through a path 309 (the acoustic wave reaching from the vibration source 304 to a portion other than the point 306 and then propagating in the optical fiber solid body and the optical fiber outer sheath), and an acoustic wave through a path 310 (the acoustic wave propagating in the optical fiber solid body and the optical fiber outer sheath via the solid body such as the wall 301 and the fastener 307).

Extracting

To remove influence of the vibration of the acoustic waves through the path 309 and the path 310 from changes in the optical path length over time at the point in the longitudinal direction of the optical fiber measured by the light reflection measurement device 305, which is transmitted to the signal processor 313, and thus to extract only the vibration through the path 308, the signal processor 313 executes signal processing by using information about a difference in a spatial wavelength in the optical fiber in the longitudinal direction, the difference being induced by a difference in vibration propagation speed between solid and gas.

Specifically, the signal processor 313 executes the signal processing based on the following facts. Speed $V_{sol}$ of an acoustic wave propagating through solid is generally equal to or higher than approximately $1 \times 10^3$ m/s, and is higher than speed $V_{air}$ of the acoustic wave propagating through air which is approximately $3 \times 10^2$ m/s. Thus, a spatial wavelength λ, represented as λ=v/f of the acoustic wave propagating through solid, where f represents frequency of the acoustic wave and v represents propagation speed of the acoustic wave, is longer than that of the acoustic wave propagating through the air.

Figure 3:
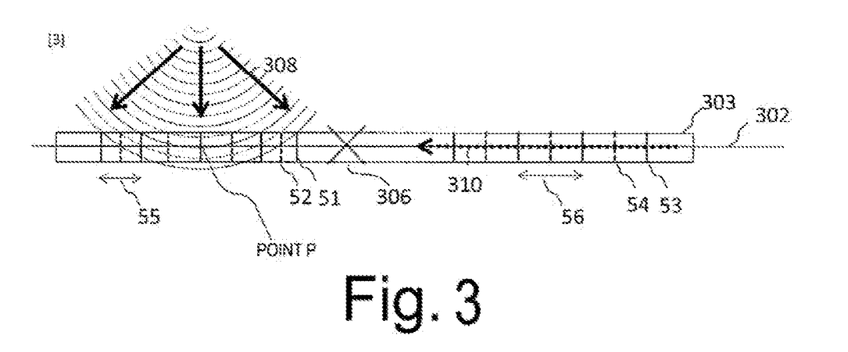
FIG. 3 is a diagram illustrating the principle of operation of the optical fiber path search system according to the present invention. Solid lines 51, 53 in the fiber represent local maximum points of change in the optical path length, and dashed lines 52, 54 represent local minimum points of change in the optical path length.
Figure 4:
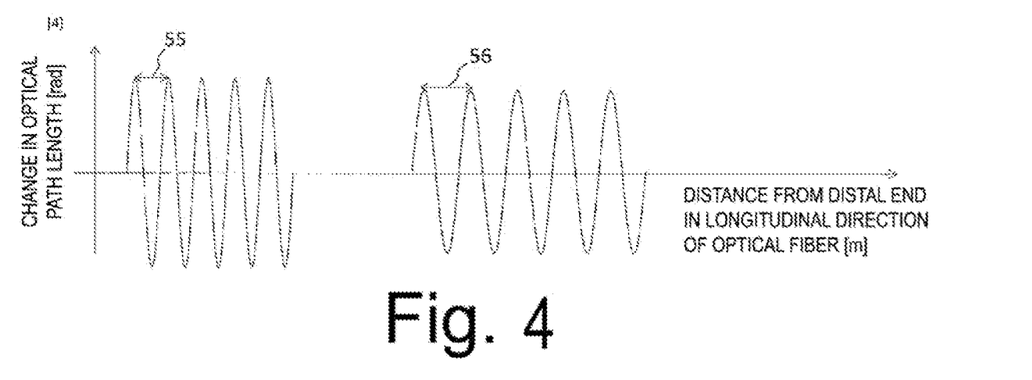
FIG. 4 is a diagram illustrating a change in the optical path length in a longitudinal direction of an optical fiber produced by an acoustic wave.

As illustrated in FIG. 3, in a change in the optical path length in the longitudinal direction of the optical fiber caused by the acoustic wave propagating through the path 308, there alternately exist a long optical path length part indicated by a solid line 51 and a short optical path length part indicated by a solid line 52. In a graph as illustrated in FIG. 4, for a time of a measurement, the horizontal axis represents a distance from the distal end in the longitudinal direction of the optical fiber and the vertical axis represents the value of the change in the optical path length over time at the measurement time point. In such a graph, a waveform with an interval between points where the optical path length is large as indicated by a distance 55 appears. The interval 55, between the points where the change in the optical path length due to the acoustic wave propagated in the path 308 is large, changes in accordance with a distance from the distal end in the longitudinal direction of the optical fiber. The interval 55 approaches the wavelength of the acoustic wave in the air at a point that is sufficiently far from the vibration source in the longitudinal direction of the optical fiber.

On the other hand, in the graph with the identical horizontal and vertical axes, the change in the optical path length in the optical fiber caused by the vibration due to the acoustic wave propagating through the path 309, 310 results in a waveform of the vibration at an interval indicated by a distance 56. The interval 56 is between the points where the change in optical path length caused by the acoustic wave propagating through the path 309, 310, is large, and is constant, because it is a value of the waveform of the acoustic wave propagating in solid.

Because the interval 56 is constant, in the signal processing executed by the signal processor 313, the change in the optical path length over time is multiplied by a spatial high pass filter having a cutoff frequency set to a value higher than a spatial frequency corresponding to a periodic oscillation at the interval 56, such that the change in the optical path length in the optical fiber caused by the vibration due to the acoustic wave propagating in solid such as the path 310 can be removed as follows.

First, D(t, l) represents data of a change in the optical path length over time at the point in the longitudinal direction of the optical fiber, measured by the light reflection measurement device 305 and transmitted to the signal processor 313 as described above. Here, t represents a time point and l represents the distance from the distal end in the longitudinal direction of the optical fiber. The signal processor 313 makes an array of pieces of the data D(t, l) each representing the change in the optical path length in the longitudinal direction of the optical fiber at the corresponding time point t. Then, the change in the optical path length in the longitudinal direction at the point is multiplied by a spatial high pass filter HPF ($f_l$) with a cutoff frequency higher than a spatial frequency corresponding to the interval 56. Thus, a signal D'(t, l) is generated, where the vibration due to the acoustic wave propagating in the solid such as the path 310 is removed.

[Math. 1]

$$D'(t,l) = \mathrm{IFT}[\mathrm{FT}[D(t,l)] \times \mathrm{HPF}(f_l)] \qquad (1)$$

In the equation, FT and IFT represent Fourier transform and Inverse Fourier transform of I, and $f_1$ represents the spatial frequency that corresponds to the distance l.

Then, the signal processor 313 makes an array of the signals D(t, 1), in which the vibration due to the acoustic wave propagating in the solid such as the paths 309 and 310 is removed, each representing the change over time at the time point t at the corresponding distance l from the distal end in the longitudinal direction of the optical fiber.

If the spatial frequency corresponding to the interval 55 is larger than the cutoff frequency of the high pass filter at a certain point at the distance l from the distal end in the longitudinal direction of the optical fiber, the waveform of vibration with the interval 55 is not removed by the high pass filter, whereby the influence of only the vibration due to the acoustic wave propagating through the path 308 is extracted. Thus, based on the onset of the envelope of the vibration due to the acoustic wave, a time point T(l) at which the acoustic wave has arrived via the path 308 can be obtained.

Since the signal generator 312 and the light reflection measurement device 305 are synchronized, defining t=0, where t is the time point when the signal generator 312 starts emitting the acoustic wave, can hold without loss of generality. Thus, the time required for the acoustic waves to reach from the vibration source is T(l). Then, a distance r(l) between the vibration source and a point at the distance l from the distal end in the longitudinal direction of the optical fiber can be determined by the following equation using the required time T(l) and the speed $V_{air}$ of the vibration propagating in the air:

[Math. 2]

$$r(l)=T(l)\times V_{air} \quad (2)$$

Note that the speed $V_{air}$ [m] of the vibration propagating in the air and temperature C[° C.] are generally in the following relationship:

[Math. 3]

$$V_{air}=331.5+0.61\times C \quad (3)$$

Thus, r(l) is uniquely determined by determining the $V_{air}$ by measuring the temperature and substituting r(l) into Equation (2) together with the required time T(l) of the vibration obtained as described above.

On the other hand, if the spatial frequency corresponding to the interval 55 is smaller than the cutoff frequency of the high pass filter at a certain point at the distance l from the distal end in longitudinal direction of the optical fiber, the waveform of vibration with the interval 55 is removed by the high pass filter, whereby no vibration due to the acoustic wave emitted from the vibration source is detected in D(t, 1). A situation in which such a case occurs will be described below.

The relationship in magnitude between the spatial frequency corresponding to the interval 55 at the point in the longitudinal direction of the optical fiber and the cutoff frequency of the high pass filter may vary depending on the setting value of the high pass filter, the positional relationship between the vibration source and the point in the longitudinal direction of the optical fiber, and the frequency of the acoustic wave emitted. In particular, the distance 55 is larger for a point in the optical fiber closer to the vibration source in the xy plane direction. The vibration source 304 is located at the positions illustrated in FIGS. 2 and 3, and P represents a point at which the spatial distance from the vibration source 304 is the shortest. In this case, as illustrated in FIG. 3, the distance 55 is the longest at the point P compared to the distances 55 at other points. Furthermore, when the point in the optical fiber is sufficiently far from the vibration source in the xy plane direction, the distance 55 approaches the wavelength in the air.

For example, in a case where the frequency of the acoustic wave emitted from the vibration source is set to $3\times10^2$ Hz, the wavelength in the air is approximately 1 m, and the spatial wavelength of the vibration in the solid can be estimated to be 3 m or more. Therefore, with the cutoff frequency of the high pass filter set to be ⅓ [m$^{-1}$], the signal D(t, 1) can be generated, with the vibration propagated in solid removed, by the signal processing method. At a point in the optical fiber sufficiently far from the vibration source in the xy plane direction, the distance 55 approaches to approximately 1 m, which is the wavelength in air. Thus, the multiplication by the high pass filter does not result in the removal, whereby the distance from the vibration source can be calculated based on Equation (2).

On the other hand, in a case where the distance in the z axis direction from the vibration source to the point P is 4 m or greater, the distance 55 around the point P is 3 m or greater, whereby the removal by the high pass filter occurs.

Thus, in the optical fiber path search system, in a case where the signal component in the high frequency region fails to be extracted in the extracting, a process from the providing the acoustic wave to the extracting the signal component is repeated with placing the vibration source 304 at a different position, and when the signal component in the high frequency region is successfully extracted, the distance can be determined in the calculating. In other words, for the point in the optical fiber in the longitudinal direction, the vibration propagating through the solid is removed by the high pass filter, and the vibration source is placed at multiple different locations in a range of positions satisfying the condition that only the vibration propagating in the air is not removed. Thus, the position of the point in the optical fiber in the longitudinal direction is determined to search for the optical fiber path. The procedure to place the vibration source in a different location will be described in detail below.

Considered is a case for searching a point at a distance l from the distal end in the longitudinal direction of the optical fiber. First, D(t, 1) is measured with the position of the vibration source fixed at certain a location, and D(t, 1) is calculated using a high pass filter set to a cutoff frequency capable of removing vibrations propagated in solid. Whether the change in the distance l from the distal end over time in D(t, 1) includes the vibration due to the acoustic wave generated by the vibration source 304 and propagated through the path 308 is checked. In a case where the vibration is observed, the distance from the vibration source 304 is calculated from the onset of the envelope of the vibration according using Equation (2).

In a case where the vibration due to the acoustic wave emitted from the vibration source 304 cannot be detected, the vibration due to the acoustic wave propagated through the path 308 may have been removed by the high pass filter due to a short distance from the vibration source 304 in the xy plane direction as in the case of the vibration source and the point P in FIGS. 2 and 3 or a long distance in the z axis direction. Thus, the position of the vibration source 304 is moved so that the vibration due to the acoustic wave propagated through the path 308 can be detected. In this process, the amplitude of the emitted acoustic wave may be sufficiently increased, thereby avoiding a failure to detect the vibration of the acoustic wave by the light reflection measurement device 305, where the failure is caused by attenuation of the acoustic wave due to a long distance from the vibration source 304.

The operation is repeated to identify, at three locations not collinear on the wall, the positions of the vibration source 304 at which the change in the distance l from the distal end over time in D(t, 1) includes the vibration due to the acoustic wave emitted from the vibration source 304 and propagated through the path 308. These three locations are referred to as points A, B, and C. With Equation (2), distances $r_A(l)$, $r_B(l)$, $r_C(l)$ between the points A, B, and C and the point at the distance l from the distal end in the longitudinal direction of the optical fiber are calculated, respectively. Defining the points A, B, and C as well as the x-axis and the y-axis to give the coordinates A (0,0,0), B(X,0,0), and C(0,Y,0), the following equations are obtained where (x(l), y(l),−$z_0$) represents the coordinates of the point at the distance l in the longitudinal direction of the optical fiber:

[Math. 4]

$$r_A^2(l) = x(l)^2 + y(l)^2 + z_o^2 \quad (4)$$

[Math. 5]

$$r_B^2(l) = (x(l)-X)^2 + y(l)^2 + z_o^2 \quad (5)$$

[Math. 6]

$$r_C^2(l) = x(l)^2 + (y(l)-Y)^2 + z_o^2 \quad (6)$$

Using Equation (4), Equation (5), and Equation (6), the following equations can be obtained:

[Math. 7]

$$x = \frac{x^2 + r_A^2 - r_B^2}{2x}, \quad (7)$$

[Math. 8]

$$y = \frac{Y^2 + r_A^2 - r_C^2}{2Y}. \quad (8)$$

Substituting $r_A(l)$, $r_B(l)$, $r_C(l)$, and the coordinates of the vibration source 304 into Equations (7) and (8) gives x(l) and y(l) uniquely. Substituting $r_A(l)$, $r_B(l)$, $r_C(l)$ into Equation (4) gives $z_0$ uniquely, which has been found to be positive. In this way, the position of the point at distance l from the distal end in the longitudinal direction of the optical fiber is obtained. The positions of the point at any distance from the distal end in the longitudinal direction of the optical fiber are similarly determined. As a result, the path of the optical fiber can be determined.

A device configuration for performing an optical fiber search that includes the high pass filtering processing will be described. First of all, to execute the high pass filtering processing, a high pass filter needs to be constructed to be capable of the following: removing the spatial frequency corresponding to the spatial wavelength of the acoustic wave in the solid corresponding to distance 56; and extracting the spatial frequency that corresponds to the spatial wavelength of the acoustic wave in the air, which is the minimum value of the distance 55 at a point in the optical fiber in the xy plane direction where the distance from the vibration source 304 is sufficiently large. Therefore, a sufficient measurement distance is required in the longitudinal direction of the optical fiber.

However, in a case where the measurement distance required to execute the high pass filtering processing is longer than the length of the optical fiber 302 beneath the wall 301, which is of a scale equivalent to the wall 301 as the measurement target, the distance for high pass filtering is shorter than the length required. Thus, when the acoustic wave propagated in solid such as the path 310 is removed, the acoustic wave propagated through the path 308 is also removed at the same time. In this case, increasing the frequency of the acoustic wave emitted from the vibration source 304 reduces the measurement distance required in the longitudinal direction of the optical fiber, thereby making it shorter than the scale of the wall 301 as the measurement target to address the issue described above. In other words, the frequency of the acoustic wave emitted may be adjusted in accordance with the scale of the wall 301 as the measurement target. For example, in a case where the size of the wall is approximately 5 m, the frequency of the acoustic wave may be equal to or higher than 100 Hz. Furthermore, execution of the high pass filtering processing involves calculation of Fourier transform FT[D(t, l)] as in Equation (1). This calculation needs to be free of aliasing at spatial frequencies corresponding to the cycles of the distance 55 and the distance 56. For example, in a case where the frequency of the acoustic wave is 100 Hz, the spatial resolution of the light reflection measurement device 305 may be set to be finer than 1.6 m.

The device configuration for executing high pass filtering is as described above. For the frequency of the vibration emitted from the vibration source 304 required throughout the procedure, first of all, such a frequency needs to satisfy a condition that the frequency is equal to or higher than the frequency required for executing the high pass filtering. In addition, the acoustic wave propagating to the optical fiber 302 provided beneath the wall 301 in FIG. 2 needs to be emitted from the vibration source 304 and detected by the light reflection measurement device 305. Thus, a vibration with the lowest possible frequency and a low attenuation rate in a medium is preferably used. Thus, the frequency of the acoustic wave emitted from the vibration source 304 may be set to a value close to the lower limit value of the frequency required for executing the high pass filtering. Furthermore, a spatial resolution of the light reflection measurement device required throughout the procedure may be the smallest of the following two values: the spatial resolution required for executing the high pass filtering and the spatial resolution required for achieving the accuracy required in the optical fiber search.

Second Embodiment

In First Embodiment, the distance between the vibration source 304 and a point in the longitudinal direction of the optical fiber is calculated based on Equations (2) and (3) by using a required time for the acoustic wave to reach the point in the longitudinal direction of the optical fiber from the vibration source 304. Alternatively, the distance between the vibration source 304 and a point in the longitudinal direction of the optical fiber can be calculated from the amplitude of the vibration due to the acoustic wave at the point in the longitudinal direction of the optical fiber.

In a case where the acoustic wave emitted from the vibration source 304 is a spherical wave, an amplitude p of the vibration decreases monotonically as the distance r from the vibration source 304 increases. The amplitude p is generally inversely proportional to the distance r from the vibration source.

[Math. 9]

$$p \propto 1/r \quad (9)$$

On the other hand, a change in the optical path length, generated by the acoustic wave that is vibrated from the vibration source 304, at a certain point at the distance l from one end in the longitudinal direction of the optical fiber connected to the light reflection measurement device 305, over time with respect to the time point t, vibrates at the identical frequency as the frequency from the vibration source 304. An amplitude L(l) of a change in the optical path length is generally proportional to an amplitude p(l) of the vibration due to the acoustic wave actually applied to the point in the longitudinal direction of the optical fiber. Therefore, the distance r(l) between the vibration source 304 and the point at the distance l in the longitudinal direction from the distal end into which probe light for the optical fiber is injected has the following relationship with the amplitude L(l) of the change in the optical path length of the optical fiber due to the vibration measured by the light reflection measurement device 305:

[Math. 10]

$$r(l) \propto 1/p(l) \propto 1/L(l) \quad (10)$$

Because both of the distance r and the amplitude L of the change in the optical path length due to the vibration are of positive values in the definition described above, the following is obtained by using a positive proportionality constant k:

[Math. 11]

$$r(l) = k/L(l) \quad (11)$$

As in the First Embodiment, D(t, l) is measured by the light reflection measurement device 305 and D(t, 1) is calculated by the high pass filtering processing. Then, L(l) can be calculated from D(t, 1) to correspond to the distance r(l) from the vibration source 304 using Equation 11.

Therefore, as in the First Embodiment using Equations (4), (5), and (6), the position of the point in the optical fiber in the longitudinal direction can be determined by moving the vibration source 304 multiple times. However, since k is an unknown constant, k is determined by performing the measurement at point D(0,Y$_2$,0) in addition to the points A, B, and C in First Embodiment. Here, the point C and the point D are different from each other. Specifically, using Equation (11), the following equations are obtained:

[Math. 12]

$$r_A^2(l) = \frac{k^2}{L_A^2(l)} = x(l)^2 + y(l)^2 + z_0^2, \quad (12)$$

[Math. 13]

$$r_B^2(l) = \frac{k^2}{L_B^2(l)} = (x(l) - X)^2 + y(l)^2 + z_o^2, \quad (13)$$

[Math. 14]

$$r_C^2(l) = \frac{k^2}{L_C^2(l)} = x(l)^2 + (y(l) - Y)^2 + z_o^2 \quad (14)$$

and

[Math. 15]

$$r_D^2(l) = \frac{k^2}{L_D^2(l)} = x(l)^2 + (y(l) - Y_2)^2 + z_o^2. \quad (15)$$

Using Equation (12), Equation (14), and Equation (15), the following Equation can be obtained:

[Math. 16]

$$k^2 = \frac{YY_2(Y_2 - Y)}{\left(\frac{1}{L_D^2} - \frac{1}{L_A^2}\right)Y - \left(\frac{1}{L_C^2} - \frac{1}{L_A^2}\right)Y_2}. \quad (16)$$

Substituting the coordinate value of the vibration source 304 and the measurement result from the light reflection measurement device 305 into Equation (16) gives k$^2$. Substituting k$^2$ into Equation (12), Equation (13), and Equation (14), gives r$_A$(l), r$_B$(l), and r$_C$(l) uniquely. As a result, Equations (12), (13), and (14) turns to be the same as Equations (4), (5), and (6), so that the path search for the optical fiber can be performed through the processing as in the First Embodiment. The coordinates of the point D may be (X$_2$,0,0) that is different from the point B.

In the case of the present embodiment, the acoustic wave emitted from the vibration source 304 may be of a single frequency continuous waveform.

Third Embodiment

Figure 5:
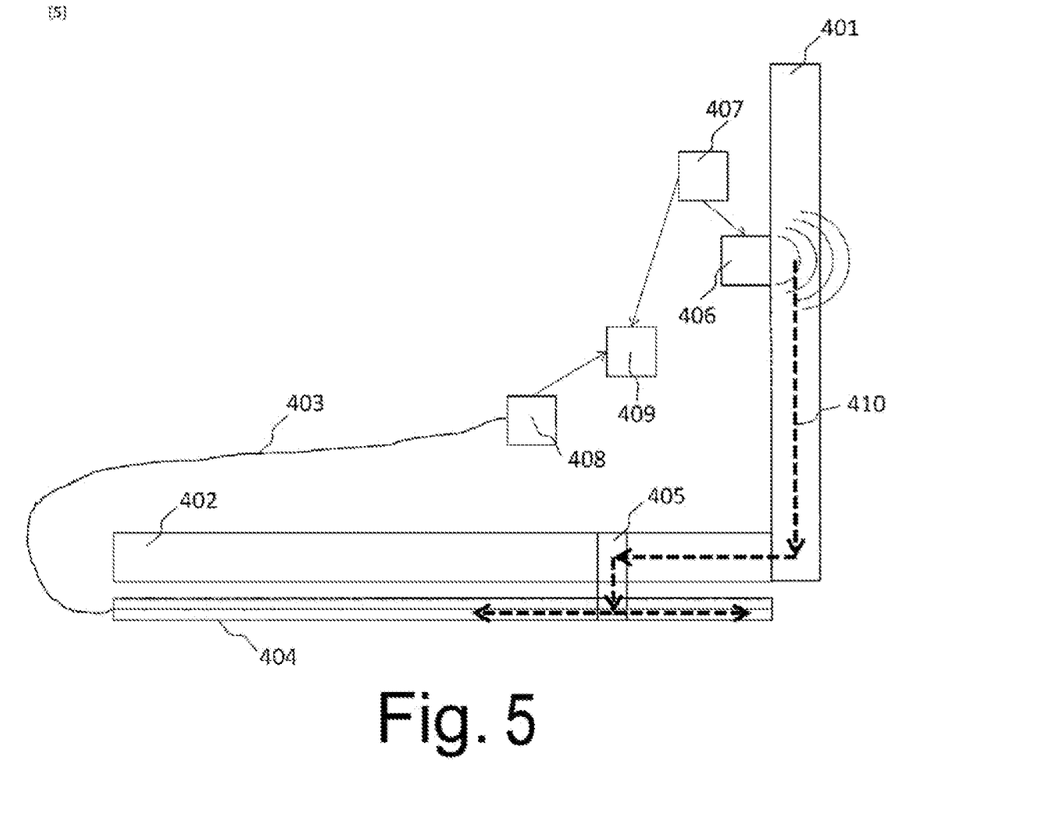
FIG. 5 is a diagram illustrating a method for searching for a path of an optical fiber in a wall using an optical fiber path search system according to the present invention.

FIG. 5 is a diagram illustrating a method for determining whether an optical fiber is provided in the wall, by using an optical fiber path search system according to the present embodiment. In the present embodiment, using the optical fiber path search system described in First Embodiments and Second Embodiment, the signal processor determines the optical fiber to be absent in the predetermined region when the signal component in the high frequency region fails to be extracted.

As illustrated in FIG. 5, there is a wall 401 and an optical fiber cable 404 including an optical fiber 403, one end of which is at a known position and accessible. An object is to determine whether the optical fiber cable 404 is present beneath the wall 401. Note that the following is assumed: even in a case where there is a wall or the like adjacent to the wall 401, and the target optical fiber cable is present beneath the adjacent wall but is not present beneath the wall 401, an acoustic wave emitted from the vibration source 304 to the wall 401 may result an acoustic wave propagating in solid to propagate to the optical fiber cable beneath the adjacent wall to thereby cause a change in the optical path length.

For example, as illustrated in FIG. 5, it is assumed that the target optical fiber cable 404 is present beneath a wall 402 adjacent to the wall 401, but not beneath the wall 401. When the acoustic wave is emitted from the vibration source 406 to determine whether a cable is present beneath the wall 401, there may be a case where vibration might be propagated through a path 410 or the like through the wall 401, the wall 402, and a fastener 405 supporting the cable 404 on the wall 402, to change the optical path length of the optical fiber 403. A description will be given for such a case, on how the presence or absence of the optical fiber cable 404 beneath the wall 401 can be determined with a lower erroneous detection rate in a general case under this condition.

First, a light reflection measurement device 408 is connected beforehand to one end of the optical fiber core 403, which is a known position. A control signal is transmitted from the signal generator 407 to the vibration source 406, and the vibration source 406 emits the acoustic wave. The acoustic wave may be a single frequency continuous wave. However, the acoustic wave has a power with a sufficient amplitude for propagating to a depth below the wall 401 as a desired location for the checking, and for changing the optical path length of the optical fiber core inside an optical fiber cable, if present, such that it is detectable by the light reflection measurement device 408.

In a case that the vibration source 406 is fixed at one location on the wall 401, the vibration source 406 emits an acoustic wave that satisfactory propagates over the area beneath entire the wall 401. The change D(t, l) in the optical path length at the point in the longitudinal direction of the optical fiber 403 is measured by the light reflection measurement device 408 at the same time as the emission of the acoustic wave. The change D(t, l) in the optical path length measured is multiplied by the spatial high pass filter HPF($f_l$), thereby generating the signal D(t, 1) with the vibration due to the acoustic wave propagated in solid, such as the path 410, removed.

The principles and calculation methods are the same as those for removing the vibration due to the acoustic wave propagating through solid such as the path 309 and the path 310 illustrated in FIG. 1 in First Embodiment. Furthermore, the conditions for the spatial resolution of the light reflection measurement device and the frequency of the vibration source for executing the high pass filtering are also the same as those described in First Embodiment, that is, are determined based on the size of the wall as the target.

Next, the signal processor 409 is used to check, at all points in the longitudinal direction, whether vibration due to an acoustic wave emitted from the vibration source is detected in the signal D☐When the acoustic wave emitted from the vibration source is detected at any point in the longitudinal direction, it is determined that the optical fiber cable 404 is present beneath the wall 401, and when the acoustic wave is not detected at any point, it is determined that there is no optical fiber cable 404 beneath the wall 401.

Instead of fixing the vibration source 406 at one location on the wall 401 and emitting an acoustic wave that sufficiently propagates over the area beneath the entire wall 401, the measurement may be repeatedly executed while moving the vibration source 406 on the wall 401 to determine whether the cable 404 is present beneath the wall 401. In this case, the wall 401 is divided into N sections denoted by numbers 1 to N, and the sections are distinguished from each other. Then, the measurement may be performed for N-times; the vibration source 406 is placed on the i-th section when the measurement is performed for the i-th time, and an acoustic wave is emitted to propagate sufficiently in the i-th section under the wall. When the emitted acoustic wave is detected by the light reflection measurement device 408, it is determined that there is a cable beneath the i-th wall. On the other hand, when the emitted acoustic wave is not detected by the light reflection measurement device 408, it is determined that there is no cable beneath the i-th wall.

As in the case described above, the determination of whether the acoustic wave emitted is detected by the light reflection measurement device 408 is performed, based on the signal which is obtained by removing the vibration due to the acoustic wave propagating in solid from the signal acquired with the light reflection measurement device 408 by high pass filtering with the signal processor 409. This operation is repeated N times so that whether the cable is present beneath all of the N sections of the wall 401 can be determined, whereby whether the cable is present beneath the wall 401 can be determined.

Determining whether the cable 404 is present beneath the wall 401 is possible in a way other than the measurement repeatedly performed with the vibration source 406 moving on the wall 401. Specifically, the determination can be made by a single measurement with N vibration sources provided on each of the N sections of the wall 401, where the acoustic waves from the individual vibration sources propagate beneath the respective sections. Furthermore, another method to determine whether the cable 404 is present beneath the wall 401 includes fixing the vibration source 406 at a predetermined position on the wall 401, performing the measurement N times respectively for the N sections of the wall 401, where performing the measurement includes emitting a directional acoustic wave in the i-th measurement, such that the directional acoustic wave propagates only beneath the i-th section.

Other Embodiments

The signal processors 313 and 409 described in First to Third Embodiments can also be realized by a computer and a program, and can also record the program in a recording medium and provide the program through a network.

Note that the present disclosure is not limited to the above-described embodiment examples as they are, and can be embodied by modifying constituent elements in an implementation stage without departing from the scope of the disclosure. In addition, various disclosures can be formed by appropriately combining a plurality of constituent elements disclosed in the above embodiments. For example, some components may be deleted from all the components shown in the embodiment. Further, components of different embodiments may be appropriately combined.

APPENDIX

An object of the present invention is to provide a method for determining a path through which an optical fiber core embedded to be in a portion not visible such as in the wall or beneath the floor of a structure such as a building, or checking whether the optical fiber core is embedded in a desired range, without destroying the wall or the floor.

In the present invention, the following signal processing is executed using the principles of DAS and GPS.
(1) The feature of the present signal processing is as follows. An optical fiber with an air layer provided in the periphery and an optical fiber cable including the optical fiber are present, an acoustic wave emitted from a vibration source is propagated to the optical fiber, and a change in the optical path length is measured at a point in a longitudinal direction of the optical fiber using a light reflection measurement device connected to one end of the optical fiber. A vibration distribution in the fiber is measured; the vibration distribution includes superimposition of: vibration with a short interval between a portion involving elongation of the optical path length and a portion involving contraction of the optical path length corresponding to a short wavelength due to an acoustic wave with a short wavelength propagated through the air from the vibration source; and vibration with a long interval between a portion involving elongation of the optical path length and a portion involving contraction of the optical path length corresponding to a long wavelength due to an acoustic wave with a long wavelength propagated through solid. The superimposed elongation/contraction distribution of the optical path length in a distance direction is regarded as a spatial wave in the optical fiber in the longitudinal direction, and is subjected to frequency filter processing so that only a waveform with a shorter elongation/contraction interval remains. Thus, only the vibration with a short elongation/contraction interval propagated in the air is extracted.

(2) The system is as follows.

An optical fiber with an air layer provided in the periphery is present, an acoustic wave emitted from a vibration source is propagated to the optical fiber, and a change in the optical path length is measured at a point in a longitudinal direction of the optical fiber using a light reflection measurement device connected to one end of the optical fiber. The signal processing (1) is applied to a signal obtained by the measurement, to extract only the change in the optical path length due to an acoustic wave with a short wavelength directly reaching the point in the longitudinal direction of the optical fiber, from the vibration source via the air. The distance between the vibration source and the point in the longitudinal direction of the optical fiber is measured using the signal extracted. This measurement is repeated multiple times for different positions of the vibration source. Thus, position information about the point in the longitudinal direction of the optical fiber is acquired, whereby optical fiber position search is implemented.

(3) The measurement method is as follows.

In a space of interest, an acoustic wave that is propagated over the entire space is emitted once or a plurality of times from a vibration source. At the same time, for an optical fiber, the presence or absence of which in the space of interest is to be checked, a change in the optical path length is measured at a point in the optical fiber in a longitudinal direction using a light reflection measurement device connected to one end of the optical fiber. The signal processing (1) is applied to the change in the optical path length detected, to generate a signal by extracting only the change in the optical path length due to an acoustic wave with a short wavelength directly reaching the point in the optical fiber in the longitudinal direction, from the vibration source via the air. Using information indicating whether the change in the optical path length of the optical fiber due to the acoustic wave is found on the signal generated, whether the target optical fiber is present in the space of interest is determined.

Effects of the Invention

With the present invention, the path of the optical fiber inside the optical fiber cable present beneath the wall, inside underground piping, or the like can be accurately determined, whereby the optical fiber cable position search can be implemented. Furthermore, it is also possible to determine whether the optical fiber cable is present in a range beneath the target wall in a simpler manner. In a structure/building in which a communication facility using optical fibers is installed, the method can be used to search for a cable position in a case where the position of the optical fiber cable present beneath the wall is unknown. Thus, accidents during work such as construction related to the target wall can be prevented, and optical wiring including the optical fiber cable can be efficiently routed. Furthermore, the present invention is also applicable to a case where the optical fiber cable is present inside the underground piping for the wiring between communication facilities, to enable the position of the underground piping to be checked through the optical fiber cable path search conducted during work such as construction around the underground piping, so that the work can be conducted safely.

REFERENCE SIGNS LIST

301: Wall
302: Optical fiber
303: Optical fiber cable
304: Vibration source
305: Light reflection measurement device
306: Certain monitor point in longitudinal direction of optical fiber
307: Fastener
308: Vibration propagation path used for optical fiber search
309: Vibration propagation path for propagating through solid, not to be used for optical fiber search
310: Vibration propagation path for propagating through solid via fastener, not to be used for optical fiber search
311: Air layer
312: Signal generator
313: Signal processor
314: Distance to wall
401: Wall 1
402: Wall 2
403: Optical fiber
404: Optical fiber cable
405: Fastener
406: Vibration source
407: Signal generator
408: Light reflection measurement device
409: Signal processor
410: Vibration propagation path for propagating through solid via fastener, not to be used for checking presence or absence of optical fiber

The invention claimed is:

1. An optical fiber path search method that utilizes distributed acoustic sensing (DAS), the optical fiber path search method comprising:
    providing an acoustic wave from a vibration source to a predetermined region;
    measuring, by a light reflection measurement device connected to one end of an optical fiber, vibration of a change in an optical path length from another end of the optical fiber to a point in the optical fiber due to the acoustic wave provided in the providing the acoustic wave;
    extracting a signal component in a high frequency region that is higher than a preset cutoff frequency from a signal of the vibration of the change in the optical path length measured in the measuring the vibration; and
    calculating a distance between the vibration source and the point in the optical fiber using the signal component extracted in the extracting.

2. The optical fiber path search method according to claim 1, wherein in a case where the signal component in the high frequency region fails to be extracted in the extracting, the vibration source is placed at a different position, a process from the providing the acoustic wave to the extracting the signal component is repeated, and when the signal component in the high frequency region is successfully extracted, the distance is determined in the calculating.

3. The optical fiber path search method according to claim 2, wherein in a case where the signal component in the high frequency region fails to be extracted in the extracting, the optical fiber is determined to be absent in the predetermined region.

* * * * *